(12) United States Patent
Haiut

(10) Patent No.: US 7,486,743 B2
(45) Date of Patent: Feb. 3, 2009

(54) DEVICE AND METHOD OF MEASURING FREQUENCY DOMAIN RESPONSE IN RF MODULATOR

(75) Inventor: Moshe Haiut, Ramat Gan (IL)

(73) Assignee: Intel Corporation, Santa Clara, CA (US)

( * ) Notice: Subject to any disclaimer, the term of this patent is extended or adjusted under 35 U.S.C. 154(b) by 969 days.

(21) Appl. No.: 10/745,629

(22) Filed: Dec. 29, 2003

(65) Prior Publication Data

US 2005/0141638 A1   Jun. 30, 2005

(51) Int. Cl.
H04L 25/03 (2006.01)
H04L 27/00 (2006.01)
H04L 23/00 (2006.01)

(52) U.S. Cl. .................... 375/296; 375/295; 375/377; 332/118; 332/127

(58) Field of Classification Search ............ 375/296, 375/295, 306, 377; 332/100, 117, 118, 123, 332/126, 127
See application file for complete search history.

(56) References Cited

U.S. PATENT DOCUMENTS

| | | | | |
|---|---|---|---|---|
| 4,609,881 A | | 9/1986 | Wells | |
| 5,305,362 A | * | 4/1994 | Miller | 377/48 |
| 5,508,469 A | * | 4/1996 | Kunimoto et al. | 84/603 |
| 5,736,893 A | * | 4/1998 | Puckette et al. | 327/551 |
| 6,008,703 A | * | 12/1999 | Perrott et al. | 332/100 |
| 6,370,371 B1 | * | 4/2002 | Sorrells et al. | 455/323 |
| 6,470,193 B1 | * | 10/2002 | Stolt | 455/562.1 |
| 6,510,174 B1 | * | 1/2003 | Sexton et al. | 375/213 |
| 6,717,998 B2 | * | 4/2004 | Adachi et al. | 375/376 |
| 6,831,954 B1 | * | 12/2004 | Mandyam | 375/286 |
| 7,050,525 B2 | * | 5/2006 | Adachi et al. | 375/376 |
| 7,075,376 B1 | * | 7/2006 | Huff et al. | 331/23 |
| 2002/0141520 A1 | * | 10/2002 | Nigrin et al. | 375/347 |
| 2003/0108246 A1 | * | 6/2003 | Takeuchi et al. | 382/232 |
| 2003/0137652 A1 | * | 7/2003 | Mori | 356/73.1 |
| 2003/0151736 A1 | * | 8/2003 | Achtenhagen et al. | 356/73.1 |

OTHER PUBLICATIONS

Kenny, et al. "Design and Realization of a Digital ΔΣ Modulator for Fractional-*n* Frequency Synthesis", IEEE Transaction on Vehicular Technology, vol. 48, No. 2, Mar. 1999.

* cited by examiner

*Primary Examiner*—Betsy L Deppe
(74) *Attorney, Agent, or Firm*—Pearl Cohen Zedek Latzer, LLP

(57) ABSTRACT

Embodiments of the invention describe a method and a device for digital measurement of the momentary frequency response of the phase-path component of a modulator, based on digitally sampling the output frequency of the modulator by clocks and count values derived from components already used by the modulator, e.g. a counter in a divider, and a reference frequency based on a crystal oscillator.

19 Claims, 4 Drawing Sheets

DEVICE AND METHOD OF MEASURING FREQUENCY DOMAIN RESPONSE IN RF MODULATOR

BACKGROUND OF THE INVENTION

Mobile Stations (MS), handheld devices, Base Stations (BS), Access Points (AP) and other devices of wireless communication systems may include transmitters to transmit Radio Frequency (RF) signals, e.g., within the range of 800 MHz-2.4 GHz. The transmitters may be linear transmitters, outphasing transmitters, and the like. Transmitters that are used to transmit continuous phase modulation signals, such as, for example, Continuous Phase Frequency Shift Keying (CPFSK) signals, Gaussian Minimum Shift Keying (GMSK) signals, 8-Phase-Shift-Keying (8-PSK), and the like, may include modulation chains of fractional-N (FN) synthesizers with built-in data modulators and Power Amplifiers. The total transfer function of the modulator is assumed to be 1:1 throughout operation. Unfortunately this assumption does not account for system instabilities, for example, tolerance variations of analog elements in the modulator circuit and the sensitivity of these elements to process and temperature. These instabilities may continually change parameters of a phase-locked loop (PLL) of the modulator during operation. For example, a bandwidth (BW) of the analog loop filter may change due to instability of capacitor values, gain of a phase detector (PD) may change due to instability of the current source, gain of a voltage controlled oscillator (VCO) may depend on its offset voltage, and frequency response of a FN closed loop may be strongly dependent on an offset frequency.

In order for the FN modulator to operate correctly, the PLL parameters should be measured or calculated for every channel hop, and the modulator should be re-calibrated in order to maintain a total transfer function of substantially 1:1 for the closed loop PLL. In devices that require channel hopping, a Pre-Distortion Filter (PDF) may be used to compensate for the changes in frequency response in the Fractional-N modulating scheme due to analog elements e.g. analog loop filters and VCO's found in a PLL. Conventionally, measurements are performed by a dedicated Analog to Digital Converter (ADC), which is an analog element as well and therefore contributes its own error and requires additional power beyond that required by the PLL.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
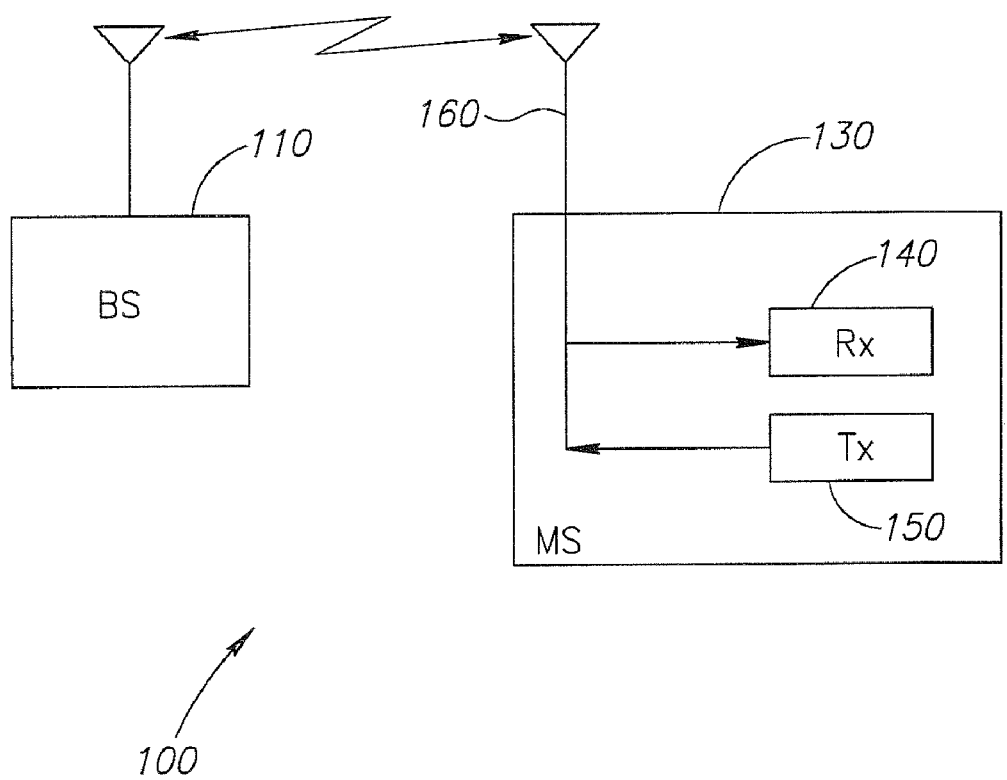
FIG. 1 is a schematic illustration of a wireless communication system that may include one or more communication stations using a modulator according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, may be presented in terms of algorithms and symbolic representations of operations on data bits or binary digital signals within a computer memory. These algorithmic descriptions and representations may be the techniques used by those skilled in the art of data processing to convey the substance of their work to others skilled in the art.

Unless specifically stated otherwise, as apparent from the following discussions, it is appreciated that throughout the specification, discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

It should be understood that the present invention may be used in a variety of applications. Although the present invention is not limited in this respect, the circuits and techniques disclosed herein may be used in many apparatuses such as receivers of a radio system. Receivers intended to be included within the scope of the present invention include, by way of example only, wireless local area network (WLAN) receivers, Bluetooth receivers, cellular radiotelephone receivers, two-way radio receivers, digital system receivers, analog system receivers and the like.

Types of transmitters intended to be within the scope of the present invention include, although are not limited to, Bluetooth transmitters, WLAN transmitters, Global System for Mobile communication (GSM) cellular radiotelephone transmitters, Time Division Multiple Access (TDMA) transmitters, Extended-TDMA (E-TDMA), General Packet Radio Service (GPRS), Extended GPRS transmitters for transmitting amplitude modulated (AM) and phase modulated signals, and the like.

Turning to FIG. 1, a wireless communication system 100, for example, a cellular communication system is shown. Although the scope of the present invention is not limited in this respect, the exemplary cellular communication system 100 may include at least one base station (BS) 110 and at least one mobile station (MS) 130. Mobile station 130 may include a receiver 140, a transmitter 150, and an antenna 160, for example, an omni-directional antenna, a highly-directional antenna, a steerable antenna, a dipole antenna, and the like.

In some embodiments of the present invention, transmitter 150 may include universal transmitter architecture to support digital data transmission. Although the scope of the present invention is not limited in this respect, the universal transmitter architecture may combine a linear amplification technique using non-linear components (LINC) with direct modulation through one or more fractional-N synthesizers. In some embodiments of the invention, one or more sets of a fractional-N synthesizer with a sigma-delta modulator may provide a desired momentary frequency deviation around a desired carrier frequency by dithering between a limited number of divider values in a phase locked loop, as described below. In embodiments of the present invention, the sigma-delta modulators may be implemented by hardware, software, or by any suitable combination of hardware and software.

Figure 2:
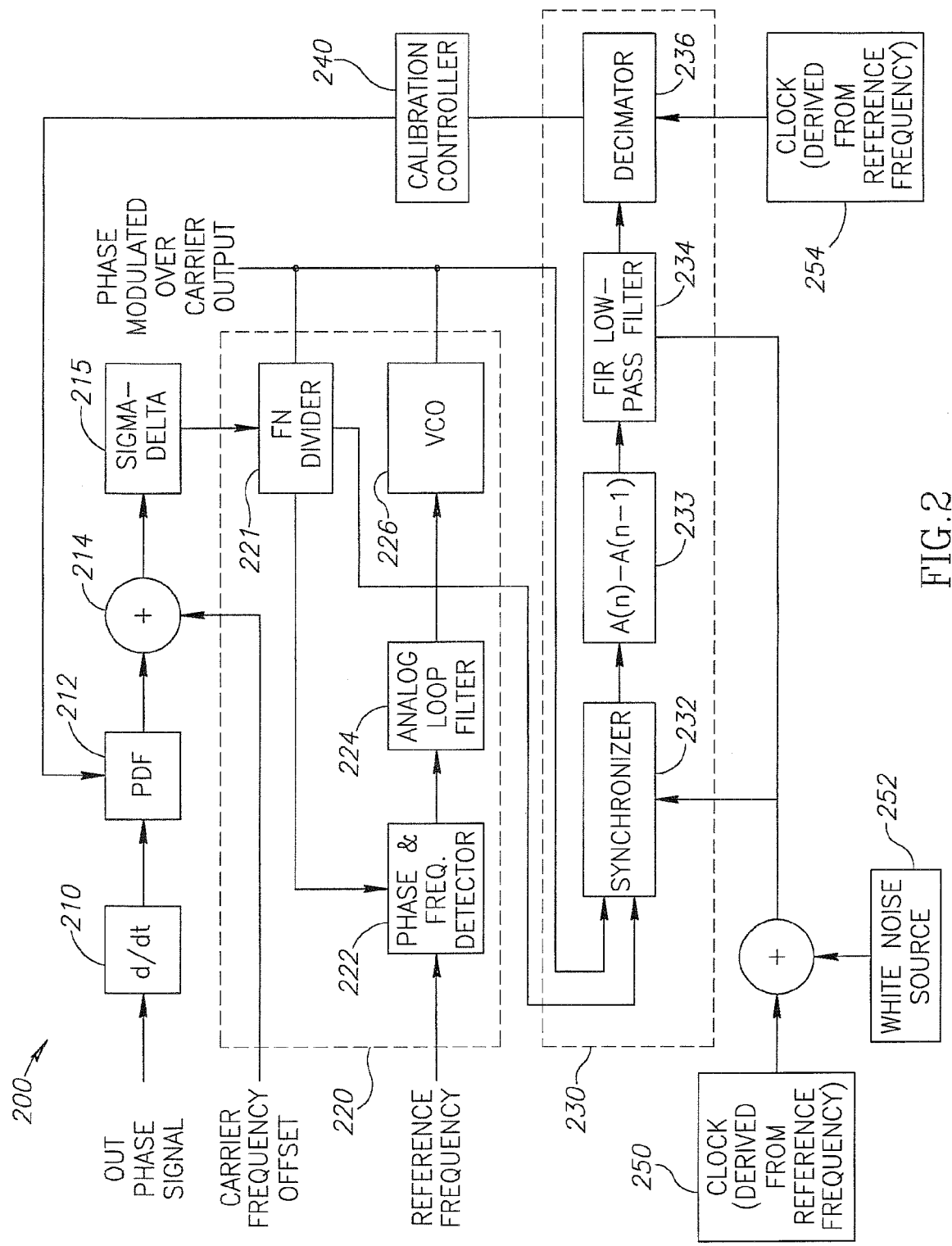
FIG. 2 is a block diagram of part of a modulation path of a station using a fractional-N modulator according to an exemplary embodiment of the present invention.

Turning to FIG. 2, a block diagram of part of a modulation path 200 of a station according to an exemplary embodiment of the present invention is shown. Although the scope of the present invention is not limited in this respect, modulation path 200 may include a phase signal differentiator 210 that may receive a phase signal, and may transfer a frequency deviation signal based on the received phase signal to a Pre-Distortion Filter (PDF) 212. The PDF may compensate for undesired deviations from a nominal transfer function of a fractional-N (FN) modulator 220, included in modulation path 200 as described below. An adder 214 may add the PDF output to a carrier frequency offset. The offset signal may be fed to a FN divider, 221, via a sigma-delta modulator 215. Although the scope of the present invention is not limited in this respect, in this exemplary embodiment of the present invention, sigma-delta modulator 215 may be implemented by hardware, software and/or by any suitable combination of hardware and software, and the like. The FN divider 221 may be part of FN modulator 220, which may also include a phase and frequency detector 222. Detector 222 may compare the output of FN divider 221 with a reference frequency, which may be generated, e.g., by a crystal oscillator, as is known in the art. Phase and Frequency detector 222 may pass the result of the comparison to an analog loop filter 224 that may provide the input for a voltage controlled oscillator (VCO) 226, which may generate a phase modulated over carrier output signal.

Although the scope of the present invention is not limited in this respect, the output generated by VCO 226 may be processed by a measurement module 230, which may be implemented by hardware, by software or by any suitable combination of hardware and/or software, and/or in any combination of units, modules or circuit configurations, in accordance with specific design requirements. In the exemplary embodiment shown in FIG. 2, module 230 may provide a calibration controller 240, which may be implemented by hardware or software or a suitable combination of both, with a frequency response signal associated with a frequency step-response function of the FN modulator, e.g., at the time of a channel hop. Calibration controller 240 may use this input to calibrate PDF 212 to compensate for a momentary frequency response characteristic of the FN modulator during a channel hop. Although not limited in this respect, as an example, the calibration controller in this exemplary embodiment of the invention may derive an impulse-response function from the measured step-response function. Based on inverse values of the coefficients of the derived impulse response function, the calibration controller may program Finite Impulse Response (FIR) coefficients of PDF 212 to compensate for the frequency response function measured by circuit 230, and may reduce deviations from a desired total transfer function, e.g. 1:1, of the modulator throughout operation.

Although not limited in this respect, in this exemplary embodiment of the invention, measurement module 230 may include a synchronizer 232 that may synchronize a count value, which may be derived from the FN divider 221, with a reference clock 250, which may be derived from a reference frequency, as described below. In some exemplary embodiments, the divider count value may consist, for example, of 5 bits, if desired, and may represent a number, e.g., modulo 32, of cycles of the output of VCO 226. The reference clock 250 may be derived from the reference frequency generated by a crystal oscillator, for example, a 78 MHz clock. In this example, a sequence of 5-bit samples that are sampled, e.g., at a 78 MHz sampling frequency provides a frequency limit of 32*78 MHZ, which may be higher than the maximum closed-loop VCO frequency, e.g., 2 GHz, and therefore may contain all the information regarding the momentary frequency of the VCO output. A cycle differentiator 233 may calculate the modulo 32 sample differences, A(n)−A(n-1), between consecutive readings from the divider count, to produce the net count of VCO cycles per cycle of reference clock 250. A Finite Impulse Response (FIR) Low-Pass Filter (LPF) 234 may receive an input signal including a plurality of samples from differentiator 233 and may remove high-frequency noise from the received samples to produce a desired VCO Step-response function. In order to be able to use a wide bandwidth filter for FIR LPF 234, white noise from a white noise source 252 may be added to reference clock 250 to produce jitter, so that the quantization noise of the divider count samples may be shifted to higher frequencies. The output from FIR LPF 234 may be down-sampled to a lower sampling rate of rate by a decimator 236. Although not limited in this respect, in the exemplary embodiment of the invention in FIG. 2, the sampling rate of the decimator may be controlled by a clock 254, for example, a 3.25 MHz clock, which may be derived from the reference frequency. The sequence of decimated samples may be fed by the decimator to the calibration controller 240 that may control the compensation provided to the modulation path by PDF 212, as described above.

It will be appreciated that the measurement module 230 described in the exemplary embodiment of this invention shown in FIG. 2 may contain essentially only digital elements. This structure ensures minimal errors and may alleviate problems associated with conventional analog measurement circuits that may require Analog to Digital Converters (ADC) for calibration measurements. Additionally, for this reason, devices incorporating exemplary embodiments of the invention may require less power for operation than conventional circuits. The exemplary embodiment shown in FIG. 2 also demonstrates that the calibration measurement may be a direct measurement of the closed-loop FN modulator 220 and not an estimate based on an open loop circuit, as may be the case in conventional circuits. The direct frequency response measurement, according to the present invention, does not require allocation of additional time but, rather, may utilize at least part of the time period inherently required for FN modulator lock after a frequency hop. Counters and/or clocks already in use by a modulation path may also be used in embodiments of this invention for the additional purpose of digitally measuring frequency response. For example, in the exemplary embodiment of FIG. 2, a 5-bit counter in the FN divider 221, as well as clocks derived from the FN modulator reference frequency, may be used for the measurement of the FN modulator frequency response.

In some exemplary embodiments of the invention, the exemplary modulation path of FIG. 2 may be included in a transmitter circuit embedded in a CMOS-RF semiconductor device, which may perform all the functions of the present invention as described herein as well as additional functionality of transmitter circuits as are known in the art.

Figure 3:
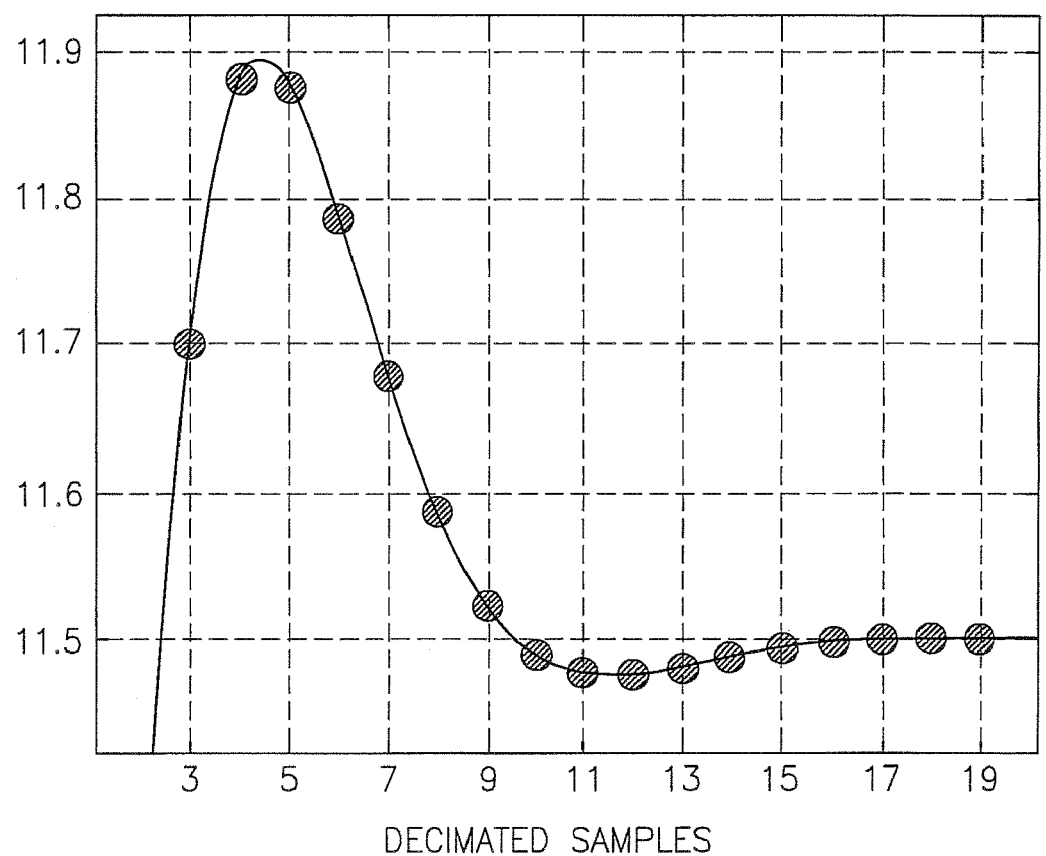
FIG. 3 is a schematic illustration of a graph depicting a simulation of frequency step-response of a fractional-N modulator according to an exemplary embodiment of the present invention.

FIG. 3 schematically illustrates a graph depicting measured frequency response of a simulated FN modulator according to an exemplary embodiment of the invention, e.g., a FN modulator similar to that shown in FIG. 2. A curve 300 shows decimated samples, e.g. as output by decimator 236, of the frequency step-response function of a simulated FN modulator, immediately following a frequency hop of the VCO output frequency, e.g., from about 11 to about 11.5, as measured in units of the frequency of a 78 MHz reference clock. The characteristics of curve 300, when processed, e.g., by calibration controller 240 as described above, may be used, for example, to calibrate FIR coefficients of PDF 212, thereby to compensate for the momentary frequency response changes of the FN modulator, e.g., during a frequency hop, as described above.

Figure 4:
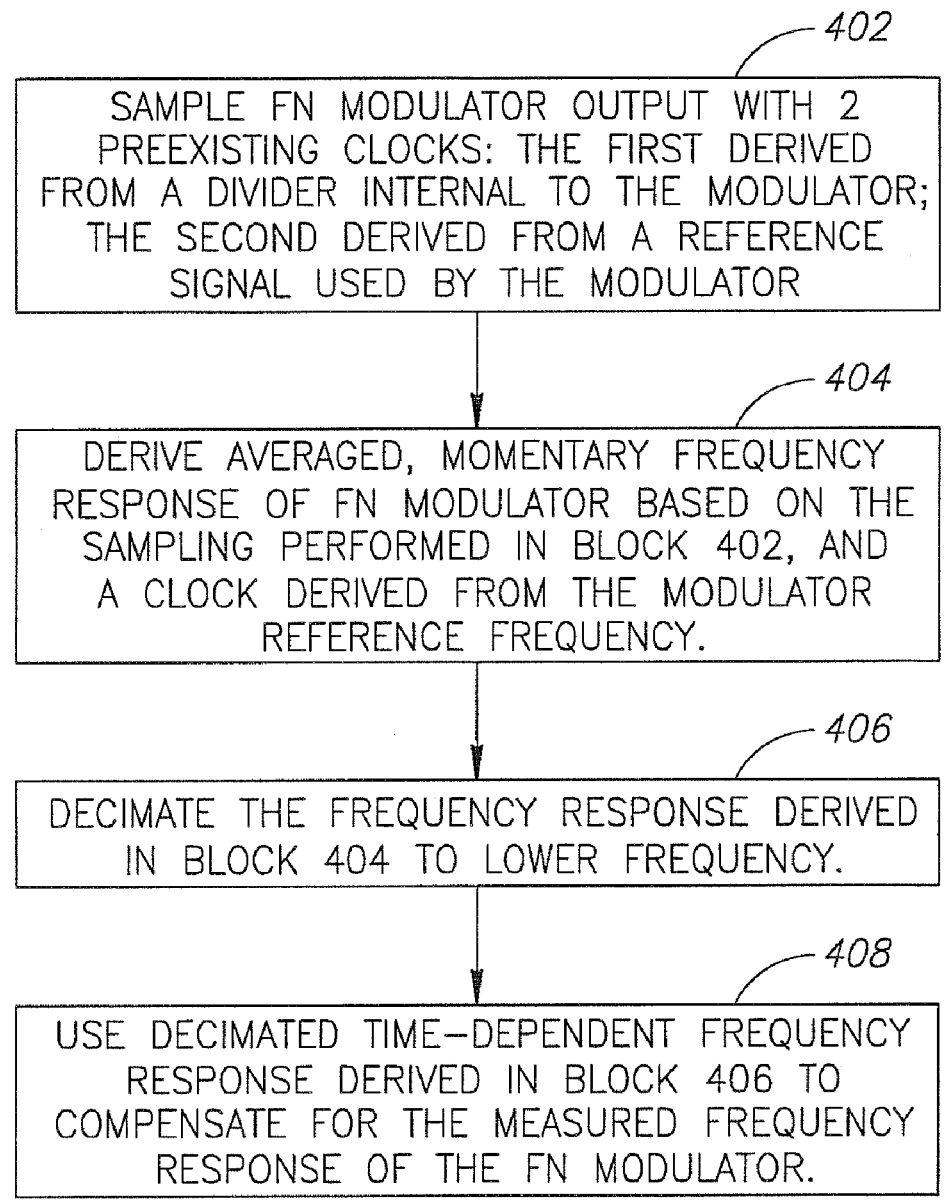
FIG. 4 is a flow chart of a method of digitally measuring the frequency response of a fractional-N modulator during a frequency hop, in accordance with exemplary embodiments of the present invention.

Turning to FIG. 4, a flow chart of a method of digitally measuring the frequency response of a FN modulator during a frequency hop, in accordance with an exemplary embodiment of the present invention is shown. Although the method described in FIG. 4 specifies a set of operations, the present invention is not limited in this respect and can be embodied in other, similar in intent, operations. Although the individual operations of the procedure are illustrated and described as separate operations, it should be noted that one or more of the individual operations may be performed concurrently. Further, the operations are not necessarily performed in the order illustrated. Modulation path 200 (FIG. 2) is an example of a modulation path suitable for use when performing this procedure; however other configurations may also be suitable.

In block 402, the FN modulator output may be sampled using one or more clocks, for example, clocks that may also be used by the modulation path for other purposes, as described above. The first clock may be derived from the FN divider and additional clocks may be derived from a reference signal used by the FN modulator. The combined sampling capability of these clocks may be sufficient for the measurement of the maximum possible output frequency for the closed loop FN modulator. In block 404, an averaged, time-dependent frequency response of the FN modulator may be derived based on the sampling performed in block 402, and using a clock that may be derived from the reference signal used by the FN modulator. In block 406, the frequency response derived in block 404 may be decimated to lower frequency. The decimator may be controlled by a clock that may be derived from the reference clock, based on the reference signal used by the FN modulator In block 408, the decimated frequency response derived in block 406 may be used to calibrate the modulation path that includes the measured FN modulator, e.g., to compensate for the time-dependent frequency response of the FN modulator. As an example, calibration may be implemented by a calibration controller, as shown in the exemplary embodiment of FIG. 2, which may program a pre-distortion filter that operates on the signal input to the FN modulator, as described above.

Some embodiments of the invention may be implemented, for example using a machine-readable medium or article which may store an instruction or a set of instructions that, if executed by a machine (for example, by station 110, and/or by other suitable machines), cause the machine to perform a method and/or operations in accordance with embodiments of the invention. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. An apparatus comprising:
a modulation path having a measurement module able to digitally measure a momentary frequency response resulting from at least one component of the modulation path;
wherein, said measurement module comprises:
a synchronizer to sample cycles of an output signal of said modulation path, using one or more clocks;
a cycle differentiator to derive a step-response function from said sampled cycles;
a white noise source to provide jitter to said one or more clocks to shift quantization noise of said step-response function into a higher frequency domain; and
a finite impulse response low-pass filter to remove high frequency noise from said step-response function and to provide a low-pass filtered step-response function.

2. An apparatus according to claim 1 wherein said modulation path further comprises:
a calibration controller able to at least partially compensate for said momentary frequency response based on a frequency response signal from said measurement module.

3. Apparatus according to claim 2, wherein said modulation path further comprises:
a pre-distortion filter able to filter a frequency deviation signal,
wherein said calibration controller is able to calibrate said pre-distortion filter based on said frequency response signal.

4. Apparatus according to claim 3, wherein said modulation path further comprises:
a phase signal differentiator to provide said frequency deviation signal by differentiating an input phase signal;
an adder to provide an offset signal by adding the frequency deviation signal filtered by said pre-distortion filter to a carrier offset frequency;

a sigma-delta modulator to provide a modulation signal based on said offset signal; and a fractional-N synthesizer to generate an output signal based on said modulation signal.

5. Apparatus according to claim 1, wherein said one or more clocks comprise one or more clocks derived from a reference signal of the modulation path.

6. Apparatus according to claim 1, wherein said one or more clocks comprise one or more clocks derived from at least one of a divider and a counter of said modulation path.

7. Apparatus according to claim 1 wherein said measurement module further comprises:

a decimator controlled by a clock derived from a reference signal of the modulation path, to lower the sampling rate of said low-pass filtered step-response function.

8. A method comprising:

digitally measuring a momentary frequency response resulting from at least one component of a modulation path generating a modulated output signal;

synchronizing sampled cycles of said modulated output signal with one or more clocks;

differentiating said synchronized sampled cycles to derive a step-response function from said synchronized sampled cycles;

providing jitter from a white noise source to said one or more clocks to shift quantization noise of said step-response function into a higher frequency domain; and low-pass filtering said step-response function to provide a low-pass filtered step-response function.

9. A method according to claim 8, further comprising:

calibrating said modulation path to compensate for said momentary frequency response.

10. A method according to claim 9 wherein calibrating comprises:

calibrating pre-distortion filter coefficients for a frequency deviation signal modulated by said modulation path to provide a filtered signal.

11. A method according to claim 8 further comprising:

lowering the sampling rate of said low-pass filtered step-response function.

12. A wireless communication device comprising:

a modulation path having a measurement module able to digitally measure a momentary frequency response resulting from at least one component of the modulation path;

wherein said measurement module comprises:

a synchronizer to sample cycles of an output signal of said modulation path, using one or more clocks;

a cycle differentiator to derive a step-response function from said sampled cycles;

a white noise source to provide jitter to said one or more clocks to shift quantization noise of said step-response function into a higher frequency domain; and a finite impulse response low-pass filter to remove the high frequency noise from said step-response function and provide a low-pass filtered step-response function and a dipole antenna to transmit an output signal modulated by said modulation path.

13. A wireless communication device according to claim 12, wherein said modulation path further comprises:

a calibration controller able to at least partially compensate for said momentary frequency response, based on a frequency response signal provided by said measurement module.

14. A wireless communication device according to claim 13, wherein said modulation path further comprises:

a pre-distortion filter able to filter a frequency deviation signal, wherein said calibration controller is able to calibrate said pre-distortion filter based on said frequency response signal.

15. A wireless communication device according to claim 12, wherein said measurement module further comprises:

a decimator controlled by a clock derived from a reference signal of the modulation path to decimate said low-pass filtered step-response function to a lower sampling rate.

16. A wireless communication system comprising:

at least two communication stations wherein at least one of the communication stations comprises:

a modulation path having a measurement module able to digitally measure a momentary frequency response resulting from at least one component of the modulation path;

wherein said measurement module comprises:

a synchronizer to sample cycles of an output signal of said modulation path, using one or more clocks;

a cycle differentiator to derive a step-response function from said sampled cycles;

a white noise source to provide jitter to said one or more clocks to shift quantization noise of said step-response function into a higher frequency domain; and a finite impulse response low-pass filter to remove high frequency noise from said step-response function and to provide a low-pass filtered step-response function.

17. A wireless communication system according to claim 16, wherein said modulation path further comprises:

a pre-distortion filter able to filter a frequency deviation signal; and a calibration controller able to calibrate said pre-distortion filter based on said momentary frequency response.

18. An article comprising a computer-readable medium, having stored thereon instructions that, when executed by a computing platform, result in:

digitally measuring a momentary frequency response resulting from at least one component of a modulation path generating a modulated output signal;

synchronizing sampled cycles of said modulated output signal with one or more clocks;

differentiating said synchronized sampled cycles to derive a step-response function from said synchronized sampled cycles;

providing jitter from a white noise source to said one or more clocks to shift quantization noise of said step-response function into a higher frequency domain; and low-pass filtering said step-response function to provide a low-pass filtered step-response function.

19. The article of claim 18, wherein the instructions further result in:

calibrating said modulation path to compensate for said momentary frequency response.

* * * * *